United States Patent
Wamprecht et al.

(10) Patent No.: US 6,423,816 B1
(45) Date of Patent: Jul. 23, 2002

(54) POLYESTER POLYOLS AND THEIR USE AS A BINDER COMPONENT IN TWO-COMPONENT POLYURETHANE COATING COMPOSITIONS

(75) Inventors: Christian Wamprecht, Neuss; Michael Sonntag, Odenthal, both of (DE)

(73) Assignee: Bayer Aktiengesellscahft, Leverkusen (DE)

( * ) Notice: Subject to any disclaimer, the term of this patent is extended or adjusted under 35 U.S.C. 154(b) by 0 days.

(21) Appl. No.: 08/583,167

(22) Filed: Jan. 4, 1996

(30) Foreign Application Priority Data

Jan. 9, 1995 (DE) .......................... 195 00 358

(51) Int. Cl.[7] .............................. C08G 63/12
(52) U.S. Cl. .................. 528/302; 528/303; 528/306; 528/307; 560/146; 252/182.28
(58) Field of Search .................. 252/182.28; 528/302, 528/303, 306, 307; 560/146

(56) References Cited

U.S. PATENT DOCUMENTS

| 3,554,951 A |   | 1/1971 | Blomeyer et al. ....... 260/29.1 |
| 4,316,940 A |   | 2/1982 | Thornley ................ 428/413 |
| 4,382,114 A |   | 5/1983 | Höhlein et al. ......... 428/423.1 |
| 4,689,266 A |   | 8/1987 | Eckler ................... 428/334 |
| 4,859,791 A | * | 8/1989 | Modelman ............... 560/91 |
| 4,894,430 A |   | 1/1990 | Höhlein et al. ........... 528/75 |
| 5,260,138 A |   | 11/1993 | Höhlein et al. .......... 428/480 |
| 5,319,056 A |   | 6/1994 | Wamprecht et al. ...... 528/49 |
| 5,349,041 A |   | 9/1994 | Blum et al. ............. 528/85 |

FOREIGN PATENT DOCUMENTS

| CA | 2138310 | 6/1995 |
| DE | 1769233 | 9/1971 |

\* cited by examiner

*Primary Examiner*—Rachel Gorr
(74) *Attorney, Agent, or Firm*—Joseph C. Gil; Thomas W. Roy

(57) ABSTRACT

The present invention relates to polyester polyols having a hydroxyl number of 60 to 400, which are esterification products of
  a) an alcohol component containing one or more aliphatic or cycloaliphatic alcohols having at least 3 hydroxyl groups and 3 to 8 carbon atoms with
  b) a carboxylic acid component containing itaconic acid, maleic acid, their anhydrides and/or fumaric acid, provided that at least 10 mole % of either component a) or component b) is an aliphatic or cycloaliphatic, saturated or unsaturated monoalcohol or monocarboxylic acid having 1 to 18 carbon atoms. The present invention also relates to two-component polyurethane coating compositions containing these polyester polyols and lacquer polyisocyanates as the binder and to their use for coating substrates, in particular automotive substrates.

7 Claims, No Drawings

POLYESTER POLYOLS AND THEIR USE AS A BINDER COMPONENT IN TWO-COMPONENT POLYURETHANE COATING COMPOSITIONS

BACKGROUND OF THE INVENTION

1. Field of the Invention

The present invention relates to new polyester polyols and their use as a binder component in two-component polyurethane coating compositions (2K PUR coating compositions), preferably for automotive refinish and for coating heavy vehicles.

2. Description of the Prior Art

It is known to coat relatively inflexible substrates, such as metal or wood, with two-component polyurethane coating compositions based on organic polyisocyanates and hydroxy-functional polyacrylates, polyethers and polyesters. The resulting coatings are distinguished in particular by excellent hardness, very good adhesion and high weather resistance. The chemical principles behind these compositions and coatings are described, inter alia, in "Lackkunstharze" (Synthetic resins for lacquers) by Hans Wagner and Hans Friedrich Sarx, Carl Hanser Verlag publishers, Munich, pp. 153 to 173, 1971.

Because the two-component polyurethane coating compositions of the prior art, especially those based on aromatic polyester polyols, often result in coatings having a tendency to yellow, particularly when exposed to short-wave UV light, they frequently fail to meet the requirements in this respect for coatings which are resistant to weathering, chalking and yellowing in automotive refinish and heavy vehicle lacquering.

A typical example of coating compositions that are susceptible to yellowing are the binders according to DE-AS 1,271,867. Although coatings prepared from these binders (aromatic polyester polyols and polyisocyanates based on hexamethylene diisocyanate) show neither loss of gloss, chalking or shade alteration after 2000 Weather-o-meter hours, they yellow distinctly after 1000 hours of exposure to short-wave UV light.

A substantial improvement in the susceptibility to yellowing of 2K PUR coatings when exposed to short-wave UV light can be achieved with the polyester polyols described in EP-A 0,318,800 and EP-A 0,571,829. However, these polyester polyols are not suitable for manufacturing 2K PUR coatings for automotive refinish and heavy vehicle lacquering because the dry time (partial drying and through drying) is too long and because the resulting coatings are highly elastic and, thus, do not have the required surface hardness.

EP-A 0,494,442 describes thermosetting one-component coating compositions which also provide UV-resistant coatings. The polyester polyols used in these coating compositions are not suitable for use as the polyol component in 2K PUR coatings for automotive refinish and heavy vehicle lacquering because the degree of branching, hardness and OH-content of the polyesters are too low to achieve quick-drying, hard coatings that are resistant to solvents and chemicals.

An object of the present invention is to provide new two-component polyurethane coating compositions which meet industry requirements and are optimally suitable in particular for automotive refinish and heavy vehicle lacquering. The new coating compositions should meet the following requirements:

1. Yellowing-free film surfaces when exposed to short-wave UV light: the coating must withstand exposure to short-wave UV light (wavelength <400 nm) for a period of at least 1000 hours without essential yellowing.
2. Good resistance to light and weather: The coating may show neither loss of gloss, chalking nor shade alteration after 2000 Weather-o-meter hours and weathering in the industrial atmosphere.
3. Quick drying at room temperature: The coating should be "sand" dry after approx. 3 hours and thoroughly dry after approx. 8 hours (DIN 53150).
4. Very good resistance to solvents and chemicals: The coating must withstand effects of common lacquer solvents, such as xylene, butyl acetate, acetone, methyl ethyl ketone and super grade gasoline and chemicals such as caustic soda solution, sulphuric acid, tree resin, pancreatin and tar, without damage.
5. High film hardness and mechanical strength: The coating should have a hardness (pendulum damping>120 s) after as few days as possible (3 to 7) and thus be scratch and abrasion resistant.
6. Adequate processing time: As a minimum, freshly prepared coating compositions must have a processing time of 6 hours, i.e., the viscosity measured as flow time out of a DIN 4 mm cup should not double within 6 hours.

These objects may be achieved in accordance with the present invention by using the polyester polyols described hereinafter as at least a portion of the polyhydroxyl component in two-component polyurethane coating compositions. The resulting coatings possess good resistance properties and are especially resistant to yellowing, quick-drying and hard.

SUMMARY OF THE INVENTION

The present invention relates to polyester polyols having a hydroxyl number of 60 to 400, which are esterification products of a) an alcohol component containing
  a1) one or more aliphatic or cycloaliphatic alcohols having at least 3 hydroxyl groups and 3 to 8 carbon atoms,
  a2) optionally one or more aliphatic or cycloaliphatic alcohols having 2 hydroxyl groups and 2 to 18 carbon atoms and
  a3) optionally one or more aliphatic or cycloaliphatic, optionally unsaturated alcohols having one hydroxyl group and 1 to 18 carbon atoms, with b) a carboxylic acid component containing
  b1) itaconic acid, maleic acid, their anhydrides and/or fumaric acid,
  b2) optionally one or more aliphatic or cycloaliphatic, saturated or unsaturated dicarboxylic acids having at least 2 carbon atoms and/or their anhydrides other than those set forth under b1) and
  b3) optionally one or more aliphatic or cycloaliphatic, saturated or unsaturated monocarboxylic acids having 1 to 18 carbon atoms and/or their anhydrides, provided that component a3) is used in an amount of at least 10 mole %, based on the total moles of component a), or component b3) is used in an amount of at least 10 mole %, based on the total moles of component b).

The present invention also relates to two-component polyurethane coating compositions containing these polyester polyols and lacquer polyisocyanates as the binder.

Finally, the present invention relates to coated substrates, in particular automotive substrates, coated with these two-component polyurethane coating compositions.

DETAILED DESCRIPTION OF THE INVENTION

The polyester polyols according to the invention differ quite substantially in their composition from the polyester polyols according to EP-A 0,318,800, EP-A 0,494,442 and EP-A 0,571,829 and German Offenlegungsschrift 43 43 452. In addition, the polyester polyols according to the invention are intended in particular for an application that is not disclosed in the above European patent applications.

The particularly good suitability of the polyester polyols according to the invention for use in the previously described coating applications is attributable to the selection of the starting materials and their amounts for preparing the polyester polyols. The polyester polyols have hydroxyl numbers of 60 to 400, preferably 80 to 350 and more preferably 100 to 300; acid numbers of 0.5 to 80, preferably 0.5 to 60 and more preferably 0.5 to 50; and a number average molecular weight, which can be calculated from the stoichiometry of the starting materials, of 500 to 10,000, preferably 600 to 5,000. The polyester polyols according to the invention are highly viscous, virtually colorless, clear resins which dissolve to give a clear solution in lacquer solvents, e.g., hydrocarbons such as toluene, xylene and higher alkylbenzenes; esters such as ethyl acetate, propyl acetate, butyl acetate, methylglycol acetate, ethylglycol acetate and methoxypropyl acetate, ketones such as acetone, methyl ethyl ketone and methylisobutyl ketone; and mixtures of these solvents.

Alcohol component a) is composed of the individual components a1) and optionally a2) and/or a3).

Component a1) is selected from aliphatic alcohols having at least 3 hydroxyl groups and 3 to 8, preferably 3 to 6, carbon atoms, such as glycerol, trimethylolpropane, pentaerythritol, sorbitol and mixtures of these alcohols.

Component a2) is selected from aliphatic or cycloaliphatic alcohols having two hydroxyl groups and 2 to 18, preferably 2 to 8 carbon atoms, such as ethylene glycol, propanediol-1,2 and -1,3, butanediol-1,3, -2,3, and -1,4, pentanediol-1,5, 2,2-methyl-1,3-propanediol, hexanediol-1,6 and -2,5, 2-methyl-2,4-pentanediol, 3-methyl-1,5-pentanediol, 2-methyl-2-propyl-1,3-propanediol, 2,2-diethyl-1,3-propanediol, 2-butyl-2-ethyl-1,3-propandiol, 1,4-cyclohexane-dimethanol, cyclo-hexanediol-1,2, -1,3 and -1,4, 2,2-bis(4-hydroxy-cyclohexyl)-propane, octahydro-4,7-methano-1H-indenedimethanol and mixtures thereof.

Component a3) is selected from aliphatic or cycloaliphatic alcohols having one hydroxyl group and 1 to 18, preferably 1 to 12 and more preferably 1 to 9 carbon atoms, such as methanol, ethanol, 1- and 2-propanol, 1- and 2-butanol, isobutanol, tert-butanol, 1-, 2- and 3-pentanol, 2-methyl-1-butanol, 3-methyl-1-butanol, 2,2-dimethylpropanol, 1-, 2- and 3-hexanol, 4-methyl-2-pentanol, 2-ethyl-1-butanol, 2,2-dimethyl-propanol, 1-octanol, 2-ethyl-1-hexanol, 1-nonanol, trimethyl-1-hexanol, 1-decanol, 1-dodecanol, 1-tetradecanol, 1-hexadecanol, 1-octadecanol, cyclohexanol, 2-, 3- and 4-methyl cyclohexanol, hydroxymethyl cyclohexane, 3,3,5-trimethyl cyclohexanol, 4-tert.-butyl cyclohexanol and mixtures of these monoalcohols. Also suitable are the corresponding monoalcohols containing ether oxygen, although these are less preferred.

Carboxylic acid component b) is composed of the individual components b1) and optionally b2) and/or b3).

Component b1) is selected from fumaric acid, maleic acid and itaconic acid, the anhydrides of the last two named acids, and mixtures thereof.

Component b2) is selected from aliphatic or cycloaliphatic, saturated or unsaturated dicarboxylic acids having at least 2 carbon atoms and/or their anhydrides other than those set forth for use as component b1). Examples include oxalic acid, malonic acid, dimethylmalonic acid, succinic acid, succinic anhydride, glutaric acid, adipic acid, pimelic acid, suberic acid, azelaic acid, hexahydrophthalic acid, hexahydrophthalic anhydride, tetrahydrophthalic acid, tetrahydrophthalic anhydride, cyclohexane-1,4-dicarboxylic acid and mixtures thereof.

Component b3) is selected from aliphatic or cycloaliphatic, saturated or unsaturated monocarboxylic acids having 1 to 18, preferably 1 to 12 and more preferably 1 to 8 carbon atoms. Examples include formic acid, acetic acid, propionic acid, butyric acid, isobutyric acid, valeric acid, 2-methylbutanoic acid, 3-methylbutanoic acid, 2,2-dimethylpropionic acid, 2-ethylbutanoic acid, 2-ethylhexanoic acid, octanoic acid, decanoic acid, dodecanoic acid, tetradecanoic acid, hexadecanoic acid, octadecanoic acid, cyclohexane carboxylic acid, cyclohexenic acid, the corresponding anhydrides and mixtures thereof.

Unsaturated component b1) is used in an amount such that the polyester polyols contain at least 0.6% by weight, preferably 2.0 to 12.0% by weight and more preferably 3.0 to 11.5% by weight of olefinically unsaturated double bonds (calculated as C=C, molecular weight 24). In addition, monofunctional component a3) is used in an amount of at least 10 mole %, based on the total moles of component a) or monofunctional component b3) is used in an amount of at least 10 mole %, based on the total moles of component b). The use of both mono-functional components a3) and b3) is also possible, but less preferred.

Preferred polyester polyols are those having an OH number of 80 to 350, which are the reaction product of a) 53.5 to 65.8 equivalent % of an alcohol component containing 30 to 90 mole % of component a1), 0 to 60 mole % of component a2) and 10 to 50 mole % of component a3) with b) 34.2 to 46.5 equivalent % of a carboxylic acid component containing 10 to 100 mole % of component b1) and 0 to 90 mole % of component b2) or the reaction product of a) 53.5 to 65.8 equivalent % of an alcohol component containing 30 to 100 mole % of component a1), 0 to 70 mole % of component a2) with b) 34.2 to 46.5 equivalent % of a carboxylic acid component 10 to 90 mole % of component b1), 0 to 80 mole % of component b2) and 10 to 50 mole % of component b3), wherein the percentages of a) and b), a1) to a3) and b1) to b3) add up to 100 in each case.

Particularly preferred polyester polyols are those having an OH number of 100 to 300, which are the reaction product of a) 54.4 to 63.4 equivalent % of an alcohol component containing 35 to 80 mole % of component a1), preferably trimethylolpropane, glycerol and/or pentaerythritol, 5 to 45 mole % of component a2), preferably neopentylglycol, 1,4-cyclohexanedimethanol and/or 1,6-hexanediol and 15 to 45 mole % of component a3), preferably cyclohexanol and/or 2-ethylhexanol with b) 36.6 to 45.6 equivalent % of a carboxylic acid component containing 25 to 100 mole % of component b1), preferably maleic anhydride and 0 to 75 mole % of component b2), preferably succinic acid, tetrahydrophthalic acid, hexahydrophthalic acid, their anhydrides, cyclohexane-1,4-dicarboxylic acid and/or adipic acid, or the reaction product of a) 54.4 to 63.4 equivalent % of an alcohol component containing 35 to 95 mole % of component a1), preferably trimethylolpropane, glycerol and/or pentaerythritol, 5 to 65 mole % of component a2), preferably neopentylglycol, 1,4-cyclohexanedimethanol and/or hexanediol and b) 36.6 to 45.6 equivalent % of a carboxylic acid component containing 20 to 80 mole % of component b1), preferably maleic anhydride, 5 to 65 mole % of component b2), preferably succinic acid, tetrahydrophthalic acid, hexahydrophthalic acid, their anhydrides, cyclohexane-1,4-dicarboxylic acid and/or adipic acid and 15 to 45 mole % of component b3), preferably cyclohexanoic acid and/or 2-ethylhexanoic acid, wherein the percentages of a) and b), a1) to a3) and b1) to b3) add up to 100 in each case.

The polyester polyols according to the invention are produced in known manner, e.g., as described in detail in "Ullmanns Encyclopädie der Technischen Chemie" (Ullmann's Encyclopaedia of Technical Chemistry), Verlag Chemie Weinheim publishers, 4th edition (1980), vol. 19, pp. 61 ff., or by H Wagner and H F Sarx in "Lackkunstharze" (Synthetic resins for lacquers), Carl Hanser Verlag publishers, Munich (1971), pages 86 to 152.

Esterification optionally takes place in the presence of a catalytic quantity of a common esterification catalyst, such as acids, bases or transition metal compounds, such as titanium tetrabutylate at approx. 80 to 260° C., preferably 100 to 240° C. The esterification reaction is performed until the desired values for the hydroxyl and acid number and/or for the viscosity have been achieved.

It is also possible not to reach the desired value for the acid number and to adjust the desired acid number by means of subsequent reaction of the polyester produced with a dicarboxylic anhydride with acid ester formation. Examples of suitable dicarboxylic anhydrides are maleic anhydride, succinic anhydride, tetrahydrophthalic anhydride and hexahydrophthalic anhydride.

In the 2K PUR coating compositions according to the invention, the polyester polyols according to the invention may be used in admixture with other organic polyhydroxyl compounds known from polyurethane coatings technology as the polyhydroxyl component. These other polyhydroxyl compounds include the known polyester (other than the polyester polyols according to the invention), polyether, polycarbonate, polyurethane and polyacrylate polyols. Of these known polyols, the polyacrylate polyols are preferred.

Suitable polyacrylate polyols are copolymers, which are soluble in the previously disclosed lacquer solvents, prepared from monomers having hydroxyl groups with other olefinically unsaturated monomers, such as butyl acrylate, methyl methacrylate, styrene, acrylic acid, acrylonitrile and/or methacrylonitrile. Suitable monomers having hydroxyl groups are preferably 2-hydroxyethyl(meth)acrylate and the hydroxypropyl-(meth)acrylate isomer mixture obtained by reacting propylene oxide with acrylic acid and/or methacrylic acid. The hydroxyl group content of the polyacrylate polyols is generally 0.5 to 6% by weight, based on solids.

In the 2K PUR coating compositions according to the invention, the polyester polyols according to the invention are used in admixture with up to 90, preferably up to 70 hydroxyl equivalent %, based on the total weight of the polyhydroxyl component, of the other polyols previously described. However, it is particularly preferred to use the polyester polyols according to the invention as the sole polyol component.

The reaction partners for the polyhydroxyl component in the 2K PUR coating compositions are the known "lacquer polyisocyanates," i.e., preferably those having urethane groups, uretdione groups, allophanate groups, and in particular biuret groups and/or isocyanurate groups. These lacquer polyisocyanates are prepared from monomeric diisocyanates such as 1,6-diisocyanatohexane, 1-isocyanato-,3,3,5-trimethyl-5-isocyanatomethylcyclohexane (isophorone diisocyanate), 1-methyl-2,4-diisocyanatocyclohexane and mixtures thereof with up to 35% by weight, based on the mixture, of 1-methyl-2,6-diisocyanatocyclohexane, 2,4-diisocyanato-toluene and mixtures thereof with up to 35% by weight, based on the mixture, of 2,6-diisocyanatotoluene, and mixtures of monomeric diisocyanates. "Lacquer polyisocyanates" having aliphatically and/or cycloaliphatically bound isocyanate groups are preferably used.

Lacquer polyisocyanates having urethane groups include the reaction products of 2,4- and optionally 2,6-diisocyanatotoluene or 1-methyl-2,4- and optionally 1-methyl-2,6-diisocyanatocyclohexane with subequivalent quantities of trimethylolpropane or mixtures thereof with simple diols, such as the isomeric propane or butane diols. The production of lacquer polyisocyanates having urethane groups in virtually monomer-free form is described in DE-PS 1,090,196.

Lacquer polyisocyanates having biuret groups, which are particularly preferred, are preferably those based on 1,6-diisocyanato-hexane. The production of these polyisocyanates is described in EP-B1-0,003,505, DE-PS 1,101,394, U.S. Pat Nos. 3,358,010 and 3,903,127.

Lacquer polyisocyanates having isocyanurate groups, which are also particularly preferred, include the trimers and/or mixed trimers prepared from the previously described disocyanates, such as diisocyanatotoluene, which are described in GB-PS 1,060,430, GB-PS 1,506,373 and GB-PS 1,485,564; the mixed trimers prepared from diisocyanato-toluene with 1,6-diisocyanatohexane, which are described in DE-PS 1,644,809 and DE-OS 3,144,672; and preferably the aliphatic and/or aliphatic/cycloaliphatic trimers and/or mixed trimers prepared from 1,6-diisocyanatohexane and/or isophorone diisocyanate, which are described in U.S. Pat Nos. 4,324,879, 4,288,586, DE-OS 3,100,262, DE-OS 3,100,263, DE-OS 3,033,860 and DE-OS 3,144,672.

The lacquer polyisocyanates employed in the use according to the invention generally have an isocyanate content of 5 to 25% by weight, a average NCO functionality of 2.0 to 5.0, preferably 2.8 to 4.0 and a residual content of monomeric diisocyanates of less than 2% by weight, preferably less than 0.5% by weight. Mixtures of the previously described lacquer polyisocyanates may also be used.

In the two-component polyurethane coating compositions according to the invention, the polyol component and the polyisocyanate component are present in quantities corresponding to an equivalent ratio of isocyanate groups to hydroxyl groups of 5:1 to 1:2, preferably 1.5:1 to 1:1.2. The two-component binders obtained by mixing the two components have only a limited processing time of approx. 4 to 24 hours and are processed either in solvent free form or preferably blended with known additives. The can be added either to the mixture or to the individual components before they are mixed together.

Examples of suitable additives include solvents such as ethyl acetate, butyl acetate, methoxypropyl acetate, methyl ethyl ketone, methylisobutyl ketone, toluene, xylene, white spirit and mixtures thereof. The solvents are used in a quantity of up to 70, preferably up to 50% by weight, based on the weight of the coating composition.

Other additives include plasticizers such as tricresyl phosphate, phthalic acid diester and chloroparaffins; pigments and fillers such as titanium dioxide, barium sulphate, chalk and carbon black; catalysts such as N,N-dimethylbenzylamine, N-methylmorpholine, zinc octoate, tin-II-octoate and dibutyltin dilaurate; levelling agents; thickeners; stabilizers such as substituted phenols; adhesion promoters such as organo-functional silanes; light stabilizers; and UV absorbers. Examples of suitable light stabilizers include sterically hindered amines such as those described in DE-OS 2,417,353 (=U.S. Pat No. 4,123,418 and US-OS 4,110,304) and DE-OS 2,456,864 (=US-OS 3,993,655 and U.S. Pat No. 4,221,701). Preferred light stabilizers include bis-(1,2,2,6, 6-pentamethyl-piperidyl-4)-sebacate, bis-(2,2,6,6-tetramethyl-piperidyl-4)-sebacate, n-butyl-(3,5-di-tert.-butyl-4-hydroxybenzyl)-malonic acid-bis-(1,2,2,6,6-pentamethylpiperidyl-4)-ester.

The moisture adhering to the fillers and pigments can be removed by prior drying or by the use of water-absorbing substances, such as molecular sieve zeolites.

The curing of the coatings can take place at room temperature and requires no increase in temperature in order to attain optimum properties. However, when the binders are used as a refinish coating, a temperature increase to approx. 60 to 100 ° C., preferably 60 to 80° C., within 20 to 60 minutes is often recommended to reduce the drying and hardening time.

The lacquers used according to the invention are especially suitable for the coating heavy vehicles such as aircraft, railway and tramway cars, lorry superstructures and the like. A further preferred field of application for the 2K PUR coating compositions is as an automotive refinish lacquer. The coating compositions are also suitable for corrosion protection applications, such as bridges and power masts, and for coating wood.

The particular advantages of the coating compositions according to the invention are a sufficiently long pot life and rapid drying at room temperature. The resulting coatings possess high ultimate hardness after 1 to 2 days, particularly good resistance to the effects of solvents and chemicals, resistance to light and weather while maintaining good gloss and, finally, resistance to yellowing when exposed to light of low wavelength, e.g. short-wave UV light, which is excellent compared to the prior art.

The coating compositions according to the invention can be applied to the substrates to be coated in known manner such as brushing, spraying or dipping. The coating compositions according to the invention are suitable both for producing primers, intermediate coats and especially top coats on the substrates to be coated.

The examples which follow serve to explain the invention in greater detail. Unless otherwise stated, all the percentages are based on weight.

EXAMPLES

General manufacturing procedure for the polyester polyols according to the invention 1. Polyesters Prepared from Monoalcohols a3)

Dicarboxylic anhydrides and monoalcohols were weighed into a reactor equipped with agitator, heating, automatic temperature control, nitrogen inlet, column, water separator and receiver, and heated to 100 to 150° C., while a stream of nitrogen was passed through the raw material mixture. After 3 hours of agitation at 100 to 150° C., the remaining polyester components were added and heated to 160 to 200° C. under agitation and while passing nitrogen through the mixture. The reaction water and perhaps a small quantity of monoalcohol was distilled off. Separated monoalcohol was returned to the reactor. When distillation was complete, the water separator was replaced by a distillation bridge and agitation took place at 160 to 200° C. until the head temperature of the column dropped to below 90° C. The column was removed and the condensation reaction was continued with increased nitrogen stream until the desired acid number and/or viscosity was obtained. Any monoalcohol which had not reacted was distilled off.

2. Polyesters Prepared from Monocarboxylic Acids b3)

All raw materials were weighed together into a reactor as described above and heated to 160 to 200° C. under agitation and while passing nitrogen through the mixture. The reaction water and a small quantity of monocarboxylic acid were distilled off. The monocarboxylic acid was returned to the reactor. When distillation was complete, the water separator was replaced by a distillation bridge and agitation took place at 160 to 200° C. until the head temperature of the column dropped to below 90° C. The column was removed and condensed out with increased nitrogen stream until the desired acid number and/or viscosity was obtained. Any monocarboxylic acid which had not reacted was distilled off.

The composition and characteristic data for the individual polyesters and/or polyester polyacrylates produced are set forth in Examples 1 to 11. The quantities given in "moles" relate, as can be seen from the weights quoted in "g", not to the actual number of "moles" in each case but to the molar ratio. The figures for the hydroxyl and acid numbers are based on "mg KOH/g."

Example 1
(According to the Invention)

| Polyester prepared from | Quantity weighed in |
| --- | --- |
| 2.05 moles of cyclohexanol | 615 g |
| 3.83 moles of trimethylolpropane | 1539 g |
| 1.18 moles of neopentylglycol | 369 g |
| 1.86 moles of maleic anhydride | 546 g |
| 3.81 moles of tetrahydrophthalic anhydride | 1737 g |
| Hydroxyl number: | 178 |
| Acid number: | 17.1 |

Example 2
(According to the Invention)

| Polyester prepared from | Quantity weighed in |
| --- | --- |
| 2.20 moles of cyclohexanol | 660 g |
| 4.10 moles of trimethylolpropane | 1647 g |
| 1.25 moles of neopentylglycol | 390 g |
| 4.00 moles of maleic anhydride | 1188 g |
| 2.00 moles of hexahydrophthalic anhydride | 945 g |
| Hydroxyl number: | 178 |
| Acid number: | 13.8 |

Example 3
(According to the Invention)

| Polyester prepared from | Quantity weighed in |
| --- | --- |
| 2.86 moles of cyclohexanol | 860 g |
| 4.10 moles of trimethylolpropane | 1650 g |
| 1.27 moles of neopentylglycol | 395 g |
| 5.59 moles of maleic anhydride | 1644 g |
| 0.62 moles of hexahydrophthalic anhydride | 287 g |
| Hydroxyl number: | 168 |
| Acid number: | 14.9 |

Example 4
(According to the Invention)

| Polyester prepared from | Quantity weighed in |
| --- | --- |
| 4.78 moles of trimethylolpropane | 1920 g |
| 1.49 moles of neopentylglycol | 465 g |
| 2.41 moles of cyclohexanoic acid | 924 g |
| 1.02 moles of adipic acid | 447 g |
| 4.09 moles of maleic anhydride | 1203 g |
| Hydroxyl number; | 157 |
| Acid number: | 2.8 |

Example 5
(According to the Invention)

| Polyester prepared from | Quantity weighed in |
| --- | --- |
| 4.49 moles of trimethylolpropane | 1803 g |
| 1.38 moles of neopentylglycol | 432 g |
| 2.41 moles of cyclohexanoic acid | 924 g |
| 2.29 moles of maleic anhydride | 672 g |
| 2.29 moles of tetrahydrophthalic anhydride | 1044 g |
| Hydroxyl number: | 159 |
| Acid number: | 7.7 |

Example 6
(According to the Invention)

| Polyester prepared from | Quantity weighed in |
| --- | --- |
| 4.70 moles of trimethylolpropane | 1890 g |
| 1.47 moles of neopentylglycol | 459 g |
| 1.19 moles of cyclohexanoic acid | 456 g |
| 1.19 moles of 2-ethylhexanoic acid | 513 g |
| 4.33 moles of maleic anhydride | 1272 g |
| 0.66 moles of hexahydrophthalic anhydride | 306 g |
| Hydroxyl number: | 173 |
| Acid number: | 5.3 |

Example 7
(According to the Invention)

| Polyester prepared from | Quantity weighed in |
| --- | --- |
| 4.81 moles of trimethylolpropane | 1935 g |
| 1.51 moles of neopentylglycol | 471 g |
| 1.19 moles of cyclohexanoic acid | 456 g |
| 1.19 moles of 2-ethylhexanoic acid | 513 g |
| 5.21 moles of maleic anhydride | 1533 g |
| Hydroxyl number: | 169 |
| Acid number: | 5.3 |

Example 8
(According to the Invention)

| Polyester prepared from | Quantity weighed in |
| --- | --- |
| 4.54 moles of trimethylolpropane | 1827 g |
| 1.41 moles of neopentylglycol | 441 g |
| 2.35 moles of 2-ethylhexanoic acid | 1014 g |
| 3.47 moles of maleic anhydride | 1020 g |
| 1.25 moles of hexahydrophthalic anhydride | 579 g |
| Hydroxyl number: | 162 |
| Acid number: | 4.8 |

Example 9
(According to the Invention)

A mixture of 60 parts by weight of a hydroxy-functional polyacrylate prepared from 41.95% by weight of styrene, 32.53% by weight of hydroxyethyl methacrylate, 24.57% by weight of butyl acrylate and 0.95% by weight of acrylic acid, and 40 parts by weight of the polyester from Example 3.

Hydroxyl number: 157
Acid number: 11.5

Example 10
(Comparison)

| Polyester prepared from | Quantity weighed in |
| --- | --- |
| 2.50 moles of trimethylolpropane | 1950 g |
| 1.65 moles of phthalic anhydride | 1420 g |
| 0.60 moles of adipic acid | 512 g |
| 1.15 moles of 2-ethylhexanoic acid | 966 g |
| 0.16 moles of maleic anhydride | 87 g |
| Hydroxyl number: | 167 |
| Acid number: | 14.7 |

Example 11
(Comparison)

A mixture of 60 parts by weight of the polyacrylate polyol from Example 9 and 40 parts by weight of the polyester from Example 10.

| | |
| --- | --- |
| Hydroxyl number: | 155 |
| Acid number: | 11.3 |

Example 12
(Use)

This example describes the manufacture of ready-to-use coating compositions based on the polyester polyols according to Example 1 to 8 and 10 and the polyol mixtures according to Examples 9 and 11, their application and the testing of the resulting coatings.

To assess the general coating properties, white coating compositions were produced. For this purpose the polyols from Examples 1 to 11 were provided with various additives and white pigment and ground on a shaking apparatus ("Red Devil").

The polyhydroxyl component was then mixed with a lacquer polyisocyanate at an NCO/OH equivalent ratio of approx. 1:1. The "lacquer polyisocyanate" was a polyisocyanate, containing isocyanurate groups, based on 1,6-diisocyanatohexane, 90% solution in butyl acetate/solvent naphtha 100 (volume ratio 1:1), NCO content of the solution—approx. 19.4% by weight, free 1,6-diisocyanatohexane content of the solution—less than 0.5%.

The following portions of additives were used, based on solids (i.e., sum of the solid polyol and polyisocyanate components):

TABLE 1

| Constituents | % by weight, based on solids |
|---|---|
| PUR catalyst (Desmorapid PP, Bayer AG, 10% solution in MPA) | 0.3 |
| Light stabilizer (Tinuvin 292, Ciba Geigy, Basle, 10% solution in xylene) | 1.0 |
| Titanium dioxide (Bayertitan R-KB-4, Bayer AG) | 80.0 |
| Anti-settling agent (Bentone 38, Kronos GmbH, Leverkusen, 10% solution in an 85:5 blend of Solvesso 100 solvent, Exxon, and Anti-Terra U pigment dispersant, Byk Chemie) | 0.7 |
| Levelling agent (Baysilone-oil OL 17, Bayer AG, 10% solution in MPA) | 0.1 |

A mixture of methoxypropylacetate (MPA), xylene and n-butyl acetate (6:1:3) was used as solvent. Dilution took place to provide a content of:

approx. 30% by weight of binder
approx. 24% by weight of pigment
approx. 0.6% by weight of additives
approx. 45% by weight of solvent.

The flow time (DIN 53211; 4 mm nozzle) was approx. 18 seconds. The coating compositions were thus ready-to-spray.

The coating compositions were applied to glass panels (wet film thickness approx. 100 $\mu$m) and dried at both room temperature and for 30 minutes at 60° C. The drying rate (DIN 53 150) was determined and then coatings were stored for 7 days at room temperature. The dry film thickness was approx. 50 $\mu$m.

The König hardness (DIN 53 157), the Gardner gloss at a 60° angle (DIN 67 530), the solvent resistance in the presence of super grade petrol (after 3 days storage at room temperature) and the Erichsen cupping were then tested. The resistance to yellowing on exposure to short-wave UV light was also tested using the QUV test (QUV-Accelerated Weathering Tester, ASTM G 53-77).

For this test clear coating compositions based on the polyols of Examples 1 to 11 were applied to aluminum sheets (68 mm×150 mm) which had first been primed and coated with white undercoat. To make these clear coating compositions, the titanium dioxide and anti-settling agent were omitted from the formulation set forth in Table 1 and a solids content of approx. 43% was obtained with the solvent mixture. After the coating compositions had been spray-applied and dried (30 minutes at 60° C.), they were stored for 7 days at room temperature and then tested in the QUV-tester (Q-Panel Company). The cycle, which lasted for 1000 hours overall, comprised 4 hours of intensive exposure to unfiltered UV light at a wavelength of approx. 280 to 370 nm (maximum 313 nm) and 4 hours in the dark. After the specimen had been washed off, the overall color difference ($\Delta$E, compared with the unweathered panel) was determined using a colorimeter to measure the yellowing that had taken place.

The results of tests on coatings prepared with the polyesters of Examples 1 to 11 are set forth in Table 2.

TABLE 2

Test results of 2K PUR coatings based on the polyols according to the invention from Examples 1 to 9 and comparative examples 10 and 11

| | Polyol from Example | | | | | | | | | | |
|---|---|---|---|---|---|---|---|---|---|---|---|
| | 1 | 2 | 3 | 4 | 5 | 6 | 7 | 8 | 9 | 10 | 11 |
| Drying 1) | | | | | | | | | | | |
| T1 (hours) | 2.5 | 2.5 | 2.5 | 3.0 | 3.0 | 3.0 | 3.5 | 3.5 | 1.0 | 3.5 | 1.5 |
| T3 (hours) | 6.0 | 6.0 | 6.0 | 7.0 | 7.0 | 7.0 | 7.5 | 7.5 | 5.0 | 7.5 | 5.5 |
| Pendulum damping: | | | | | | | | | | | |
| 23° C.+ 7 d RT (s) | 135 | 144 | 194 | 120 | 181 | 145 | 135 | 109 | 176 | 159 | 130 |
| 30' 60° C. + 7 d RT (s) | 202 | 193 | 205 | 169 | 216 | 179 | 167 | 145 | 218 | 182 | 185 |
| Gloss 2) (< 60°) | 93/92 | 94/92 | 92/91 | 92/91 | 94/92 | 93/91 | 94/93 | 92/91 | 91/90 | 94/93 | 91/90 |
| Resistance to super grade petrol 3): 23° C. + 3 d RT | 0 | 0 | 0 | 0 | 0 | 0 | 0 | 0 | 0 | 0 | 0 |
| QUV Test ($\Delta$E) 200 hrs/1000 hrs | 4.1/5.8 | 4.3/5.9 | 3.9/5.9 | 4.9/5.5 | 5.4/6.8 | 5.1/6.2 | 4.8/5.7 | 4.5/5.6 | 3.6/5.1 | 12.1/18.5 | 7.8/12.0 |
| Erichsen cupping (mm) | 8.3 | 8.5 | 8.2 | 9.0 | 8.1 | 8.7 | 8.9 | 9.2 | 8.0 | 9.1 | 8.2 |

1) T1 "sand" drying, T3 through drying (DIN 53150)
2) Before and after the QUV Test
3) 0 = best value (no effect), 5 worst value (coating dissolved)

Discussion of the Results

After rapid drying, 2K PUR coatings based on the polyols from Examples 1 to 11 had a high pendulum hardness, were highly glossy, elastic and resistant to the effects of super grade petrol. The results of the color measurements illustrate in particular the excellent UV resistance of the lacquers according to the invention from Examples 1 to 9 compared with comparative examples 10 and 11.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyester polyol having a hydroxyl number of 60 to 400, which is the esterification product of
   a) an alcohol component comprising
      a1) one or more aliphatic or cycloaliphatic alcohols having at least 3 hydroxyl groups and 3 to 8 carbon atoms,
      a2) optionally one or more aliphatic or cycloaliphatic alcohols having 2 hydroxyl groups and 2 to 18 carbon atoms and
      a3) optionally one or more aliphatic or cycloaliphatic, saturated or unsaturated alcohols having one hydroxyl group and 1 to 18 carbon atoms,
   with
   b) a carboxylic acid component comprising
      b1) itaconic acid, maleic acid, their anhydrides and/or fumaric acid,
      b2) optionally one or more aliphatic or cycloaliphatic, saturated or unsaturated dicarboxylic acids having at least 2 carbon atoms and/or their anhydrides other than those set forth under b1) and
      b3) optionally one or more aliphatic or cycloaliphatic, saturated or unsaturated monocarboxylic acids having 1 to 18 carbon atoms and/or their anhydrides,
   provided that component a3) is used in an amount of at least 10 mole %, based on the total moles of component a), and component b1) is used in an amount of at least 55.7 wt. %, based on the total weight of component b), or component b3) is used in an amount of at least 10 mole %, based on the total moles of component b) and component b1) is used in an amount of at least 49.9 wt. %, based on the total weight of component b).

2. The polyester polyol of claim 1, which has a hydroxyl number of 80 to 350 and is the esterification product of
   a) 53.5 to 65.8 equivalent % of an alcohol component containing 30 to 90 mole % of component a1), 0 to 60 mole % of component a2) and 10 to 50 mole % of component a3) with
   b) 34.2 to 46.5 equivalent % of a carboxylic acid component wherein the percentages of a) and b), and the percentages of a1) to a3), add up to 100 in each case.

3. The polyester polyol of claim 1, which has a hydroxyl number of 80 to 350 is the esterification product of
   a) 53.5 to 65.8 equivalent % of an alcohol component containing 30 to 100 mole % of component a1), 0 to 70 mole % of component a2) with
   b) 34.2 to 46.5 equivalent % of a carboxylic acid component containing 10 to 50 mole % of component b3),
   wherein the percentages of a) and b), and the percentages of a1) and a2), add up to 100 in each case.

4. The polyester polyol of claim 1 wherein component a3) is used in an amount of at least 10 mole %, based on the total moles of component a), and component b1) is used in an amount of at least 55.7 wt.%, based on the total weight of component b).

5. The polyester polyol of claim 1 wherein component b3) is used in an amount of at least 10 mole %, based on the total moles of component b) and component b1) is used in an amount of at least 49.9 wt. %, based on the total weight of component b).

6. The polyester polyol of claim 1 wherein component b3) is present and comprises a cycloaliphatic monocarboxylic acid.

7. The polyester polyol of claim 5 wherein component b3) comprises a cycloaliphatic monocarboxylic acid.

* * * * *